W. P. BETTENDORF, DEC'D.
J. W. BETTENDORF, ADMINISTRATOR.
ANNEALING FURNACE.
APPLICATION FILED MAR. 27, 1911.
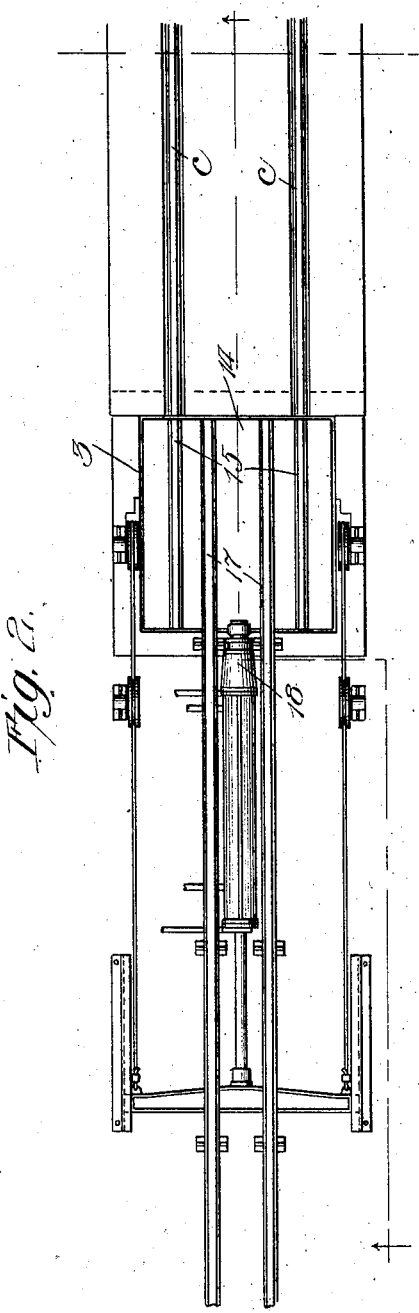
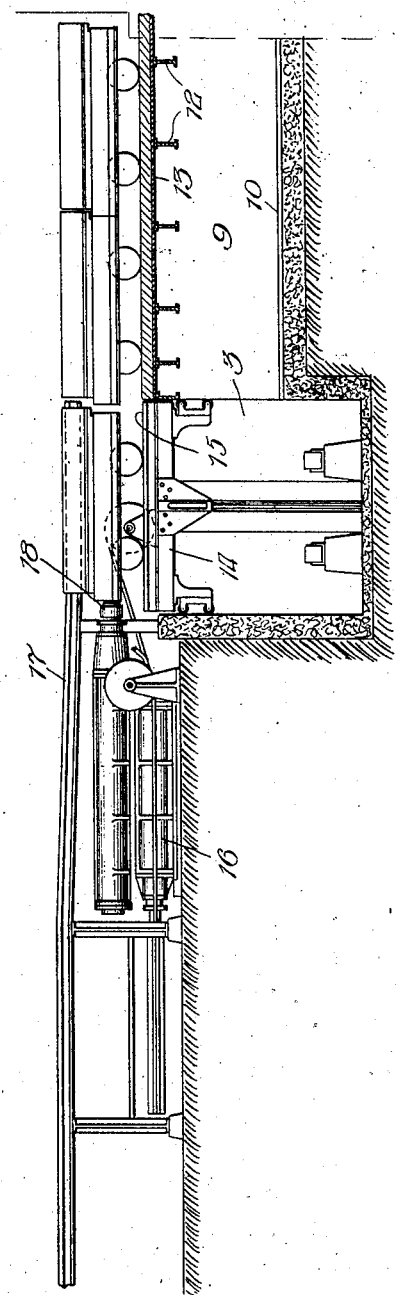

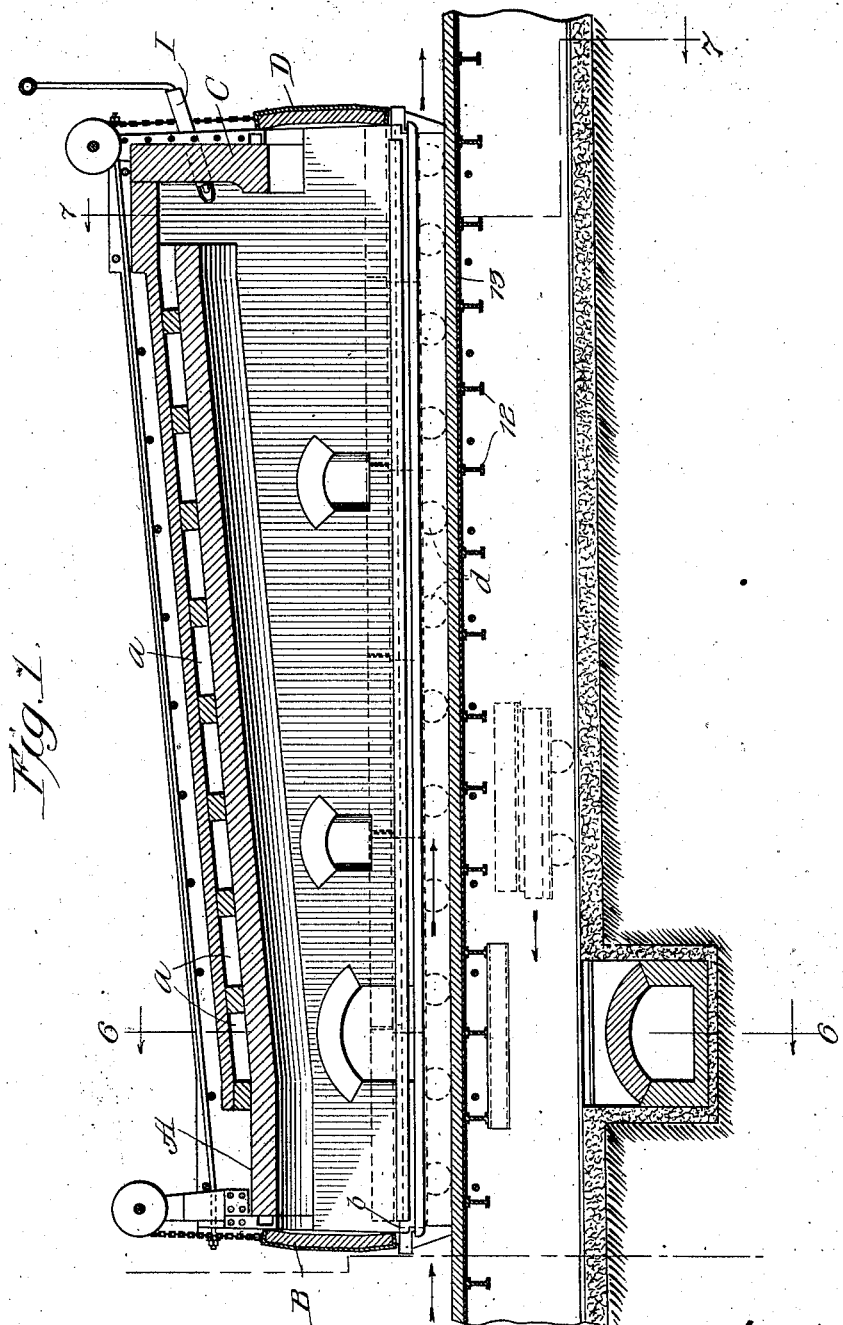

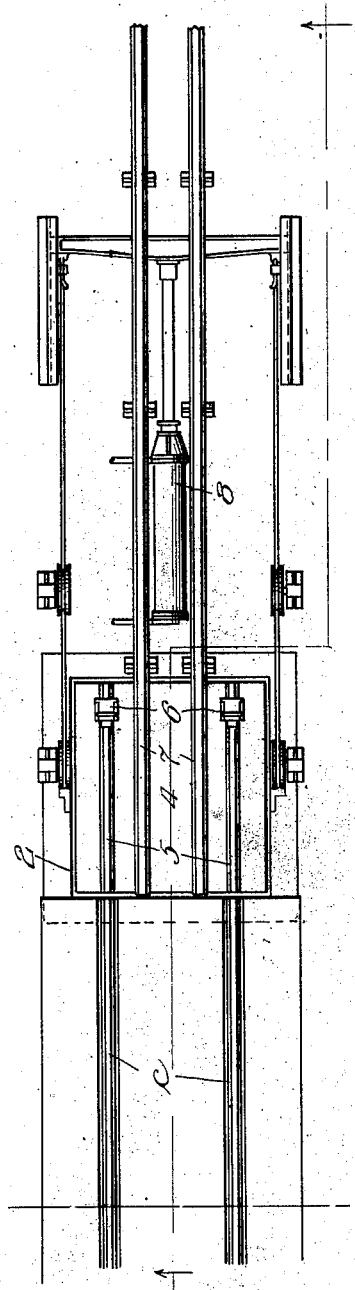
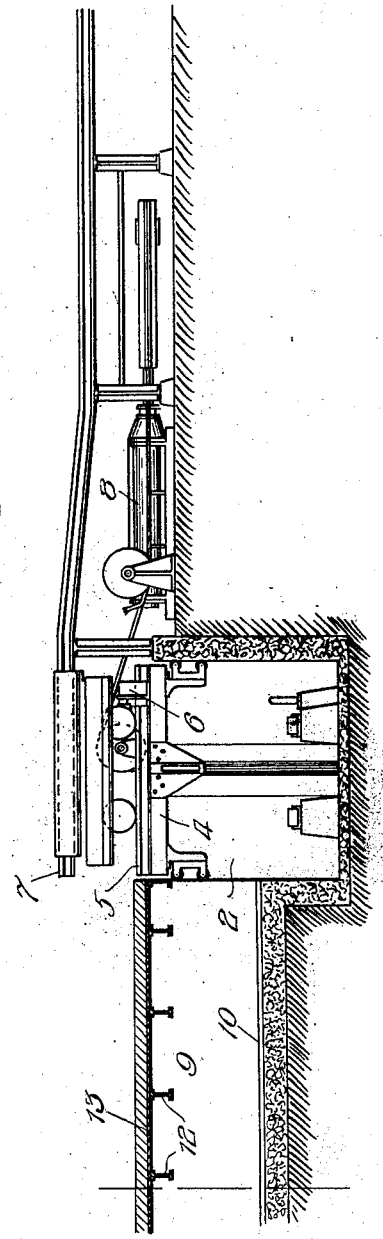

W. P. BETTENDORF, DEC'D.
J. W. BETTENDORF, ADMINISTRATOR.
ANNEALING FURNACE.
APPLICATION FILED MAR. 27, 1911.
1,091,184.
Patented Mar. 24, 1914.
6 SHEETS—SHEET 4.
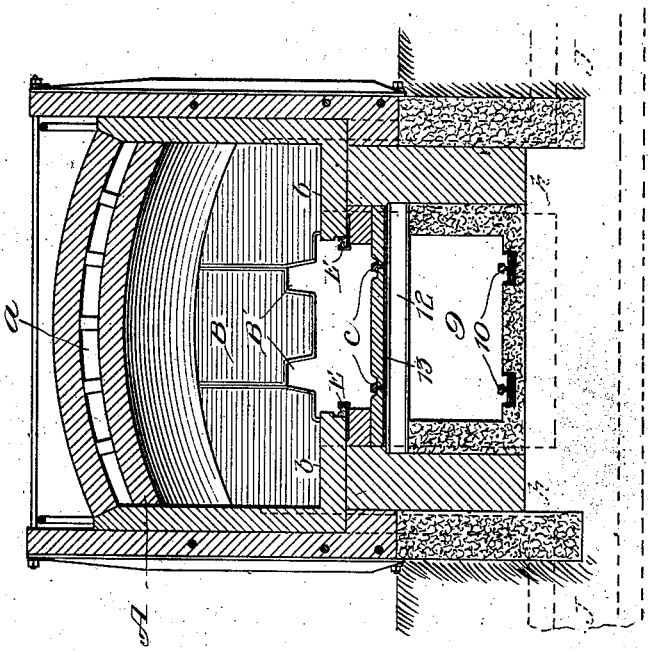
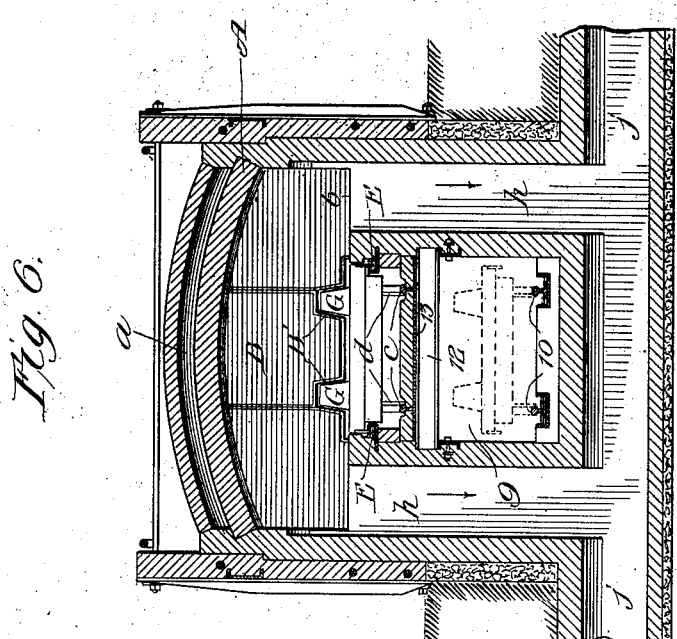
Witnesses:
Inventor:
William P. Bettendorf deceased
Joseph W. Bettendorf administrator
by Frank D. Thomason
atty

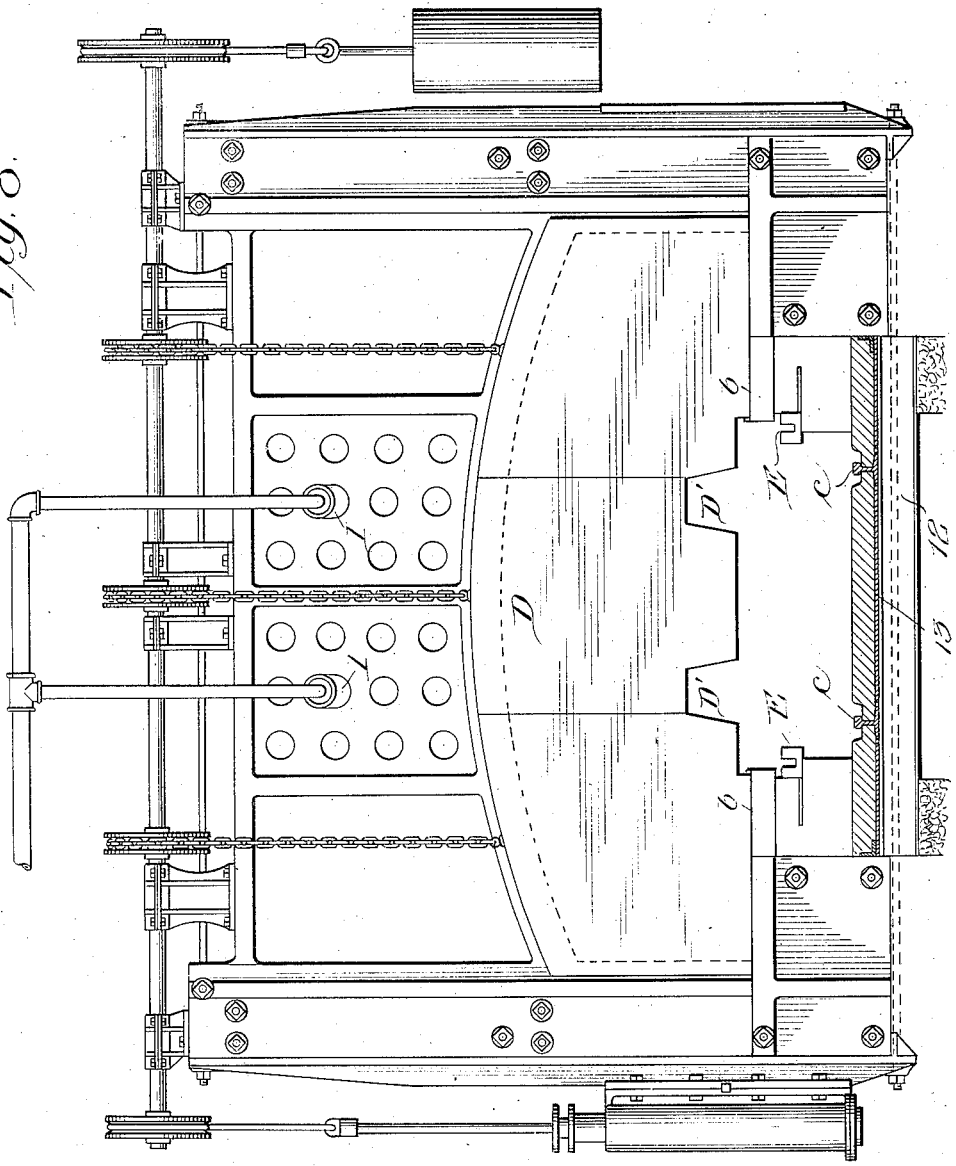

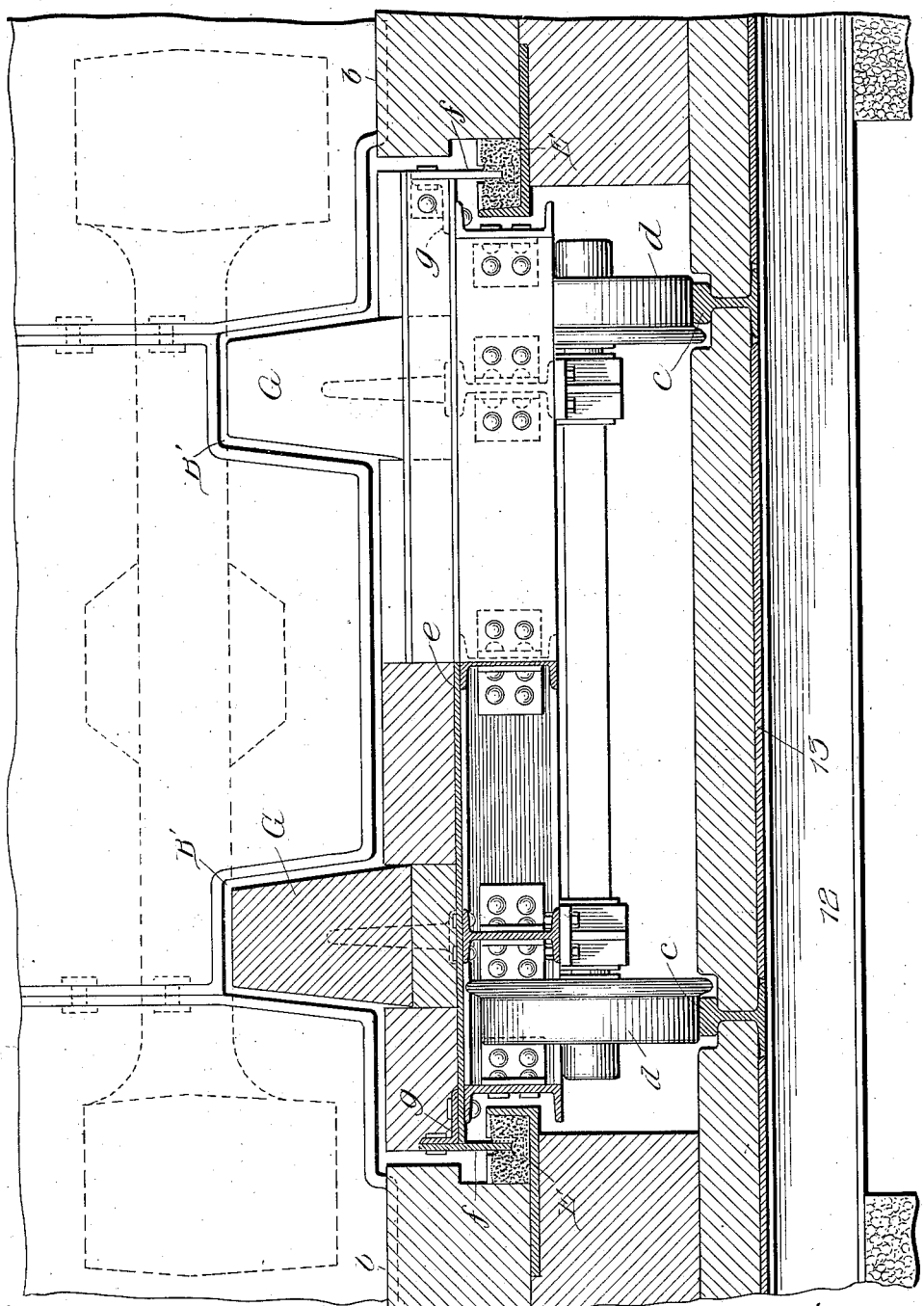

UNITED STATES PATENT OFFICE.

WILLIAM P. BETTENDORF, DECEASED, LATE OF BETTENDORF, IOWA, BY JOSEPH W. BETTENDORF, ADMINISTRATOR, OF BETTENDORF, IOWA.

ANNEALING-FURNACE.

1,091,184.  Specification of Letters Patent.  Patented Mar. 24, 1914.

Application filed March 27, 1911. Serial No. 617,254.

*To all whom it may concern:*

Be it known that WILLIAM P. BETTENDORF, deceased, late a citizen of the United States, residing at Bettendorf, in the county of Scott and State of Iowa, did invent certain new and useful Improvements in Annealing-Furnaces, of which the following is a full, clear, and exact description.

This invention relates to improvements in steel annealing furnaces.

Heretofore it has been customary in annealing furnaces of the character to which this invention relates, to load a large car or truck with twenty, thirty or forty tons of castings, shove it into the furnace and start the fire. After, from three to five hours, the car was withdrawn from the same end of the furnace it entered, and the heated mass cooled for from five to six hours before it could be unloaded. During this long wait the furnace becomes cooled down to a great extent and considerable fuel has to be expended to re-heat it to the required working temperature again. In addition to these objections, the furnaces were so constructed that side-tracks and switches and a traveling crane were necessary for the convenient and proper handling of the cars and their loads, that involved the use of considerable labor.

The object of this invention is to provide an annealing furnace in which the work can be moved into the furnace, subjected to the annealing of the heat, and discharged from the furnace, without lowering the temperature of the furnace very materially and requiring the expenditure of a large amount of fuel to restore it to its working temperature.

Another object of said invention is to automatically load the cars or trucks used in connection with said furnace and move them step by step, arranged one after the other with their ends in contact, into and out of the furnace, unload them, and return them to their place of beginning or starting point, and keep this cycle of operation agoing as long as desirable.

These and other objects are accomplished by means hereinafter fully described and as particularly pointed out in the claims.

In the drawings: Figure 1 is a longitudinal central section of my improved furnace, with the end approaches and mechanical structures used in connection with said approaches broken away. Fig. 2 is a plan view of the left hand or intake approach of the furnace broken away therefrom. Fig. 3 is a longitudinal section thereof. Fig. 4 is a plan view of the right hand approach or exit end of the furnace broken away therefrom. Fig. 5 is a longitudinal section thereof. Fig. 6 is a transverse vertical section taken on dotted line 6, 6, Fig. 1. Fig. 7 is a similar section taken on dotted line 7—7, Fig. 1. Fig. 8 is an end elevation of the exit end of the furnace proper drawn to a larger scale. Fig. 9 is an end elevation of a fragment of the furnace, drawn to a still larger scale and showing one half of the truck and all of its supporting structure in section.

Generally speaking, the scheme involved in this invention is to run the loaded car into the annealing furnace at one end, and out of the other without materially reducing the temperature of the annealing chamber; then moving the car, as it is discharged, onto an elevator platform, and lowering the car down to the upper part of an inclined tunnel; the car being relieved of its load as it begins to move downward. Then starting the car down through the tunnel, which runs longitudinally under the furnace to an elevator shaft located a suitable distance beyond the opposite end of the furnace, onto the elevator platform therein, and then raising the same again to the surface. As the last mentioned elevator reaches the limit of its upward movement the car picks up the castings it is designed to carry, and is then ready to be moved toward the charging end of the furnace again and to and through the same, in its turn.

The furnace consists of a chamber about two and a half times as long as it is wide, and has a ceiling A which is less in height at its charging end, where it is, say eight feet high, than at its discharge end, where it is, say ten feet high. The side-walls are lined with fire-brick, and the roof is an arch lined with fire-brick and preferably, built so as to provide dead air spaces *a* to reduce the radiation. At its charging end, it is provided with a vertical sliding door B, and at its discharge end it is provided with a drop-wall C that closes the upper end or upper portion of said end, but leaves an opening of about the same height as that of the entrance of the charging end, which is closed by a vertical sliding door D.

The central portion of the floor b of this furnace is depressed to form a longitudinal channel or run, the depth of which corresponds to the height of the upper surface of the floor of the car used in connection with the furnace, and suitable rails c are secured in the bottom of this channel upon which the wheels d of said car travel. The floor of the furnace, and the bottom and the sides of said channel are made of suitable refractory material, and at about the center of the height of its sides, the channel is made slightly wider to provide shoulders which support troughs E. These troughs extend the entire length of the furnace and are, preferably, made of suitable angles the longer legs or sides of which are embedded and secured in the material of the side-walls of the channel, and the shorter vertical portions of which overhang the lower portions of the side-walls of the channel and are turned upward to form the outer wall of the troughs. These troughs E are filled with sand, and their ends are closed by suitable end-plates that are provided, in alinement with about the transverse center of the troughs, with vertical slits.

The floors of each car consist of a metal sub-floor e, and a covering of fire-brick or other refractory material, and the altitude thereof above the rails, and the width of the same are such that their longitudinal sides are in a vertical plane intersecting the center of width of the troughs E. The side edges of the sub-floor e have shoes or runners f, f, consisting of vertical plates secured thereto by means of angles, g, and the lower edges of these shoes depend below said floor and are buried in the sand as the cars pass through the annealing chamber. The engagement of these shoes with the sand-troughs forms an effective seal and prevents the heat from the annealing chamber permeating into the channel below the floors of the cars and affecting the running gear of the latter. The advanced end edges of the trucks, as shown in Fig. 3 of the drawings, are rabbeted on the underside, and the rear ends of the cars are correspondingly rabbeted on the other side, and when any two cars are brought in contact, the end edges of one will overlap the end edges of the other.

The cars are provided with longitudinal parallel benches G of suitable refractory material that are located mediate their centers of width and their centers of sides. These benches G extend from end to end of the car and rise a considerable distance above the floor of the same and form supports on which the castings, to be annealed, rest. The castings thus bridge over the space between the benches and permit a better circulation of the heat between them and the floor of the car. As before intimated, when this improved furnace is in operation the channel is filled with trucks from one end of the furnace to the other, and in order to accommodate the passage of the benches G of the trucks at each end of the furnace, the lower edges of the vertical doors B and D are provided with recesses B' and D', substantially as shown in Figs. 8 and 9.

The upper part of the discharge end of the furnace is provided with a drop-wall C and oil-burners, I, are inserted therethrough which force immense flames into the furnace at a slightly downward angle, at a suitable point below the roof, and the flames and heat from the burners is carried the entire length of the furnace heating the same thoroughly and gradually brought nearer and nearer the work by the inclined ceiling of the same, and in every part. Near the charging end of the furnace the floor thereof, on either side of the car channel, is provided with downward extending shafts h into which the heated products of combustion from the furnace discharge and are directed thereby to and out of the lateral flues j with which the lower ends of shafts h communicate.

The rails c of the track upon which the cars travel are extended beyond the ends of the furnace a suitable distance, and terminate at the mouth of elevator-shafts 2 and 3, respectively. Shaft 2 is provided with a suitable elevator 4, which is provided with rails 5 of the same gage that aline with rails c, c, and when the elevator is at the limit of its upward movement, and the car is run out of the furnace, it advances step by step until it finally moves to and onto the elevator-platform until it comes in contact with and is stopped by the metal stop-castings 6, secured to the rails. As the car moves onto the platform the castings supported by the benches G of the same pass above the end reaches of parallel receiving rails 7—7. The distance between rails 7 is less than the distance between benches G, G, and as the elevator platform is lowered thereon, the castings on the car will come in contact with the overhanging reaches of the receiving rails and the truck will thereby be relieved from the weight of the same. Elevator 4 is raised and lowered through the medium of a cylinder or piston 8, and when it reaches the lower limits of its movement the upper surface of its platform will be in the same plane as the floor of a tunnel 9. This tunnel 9 extends longitudinally under the surface tracks c, c, of the furnace and its approaches, and is provided with rails 10 of the same gage as the tracks c, c, which extend the full length of the tunnel and terminate at their opposite ends in an elevator shaft 3. The side-walls of this tunnel are a downward continuation of the lower portion of the side-walls of the channel of the furnace, and below the floor of said channel these side-walls are provided with in-set channel-irons, the upper edges of which support cross-beams 12, upon which the metal support 13 rests that sustains the refractory flooring of the car channel and its approaches. The bottom of this tunnel is preferably made of suitable concrete material and inclined from shaft 2 to a shaft 3 at a grade just sufficient to cause the cars, when they move off of the elevator 4, to gravitate down toward shaft 3.

Shaft 4 is provided with an elevator 14 which, preferably, corresponds in construction to the elevator platform 4, which is provided with a track corresponding to that in the tunnel. This elevator is operated through the medium of a cylinder and piston 16, that are substantially the same in construction and operation as cylinder 8 and its piston, and when an empty car is allowed to gravitate down through the tunnel, it will gravitate onto the elevator platform 14. When the elevator platform 14 is raised to the limit of its upward movement with the car thereon, the benches G of the car will lift any castings or work that may have been previously mounted on the overhanding reaches of delivering rails 17. In this position, the car upon the elevator platform will be engaged, when the proper time arrives, and moved forward a distance corresponding to its length toward the furnace, by a hydraulic or steam-ram 18, and moved into engagement with the car preceding the same, and thereby cause the whole train of cars to move forward and push a fresh car with its load into the furnace and to discharge the car within the annealing chamber next the discharge end thereof out of the furnace— the doors B and D having been previously lifted to permit this movement to take place, and then lowered again when this general forward movement of the cars has taken place.

What I claim as new is:—

1. An annealing furnace comprising an annealing chamber, the floor of which is provided with a longitudinal channel, a series of separate physically distinct cars having end to end contact within said channel, an endless run therefor extending throughout its length in the same vertical plane which run passes through and out of said chamber traversing said channel, suitable closures for the ends of said chamber above the plane of the floors of said cars, means for automatically unloading said cars beyond the discharge end of said chamber, and means for automatically loading the same before their entrance to said chamber.

2. An annealing furnace comprising an annealing chamber the floor of which is provided with a longitudinal channel, in combination with a series of end to end contacting cars, an endless run therefor extending throughout its length in the same vertical plane which run passes through and out of said chamber in said channel, said cars having the longitudinal sides thereof contacting with the structure of the side walls of the channel, and suitable closures for the ends of said chamber.

3. An annealing furnace comprising an annealing chamber the floor of which is provided with a longitudinal channel, and longitudinal sand-troughs secured to the side walls of said channel, a series of end to end cars, an endless run therefor extending throughout its length in the same vertical plane which run passes through and out of said chamber, said cars having depending side-plates the lower edges of which traverse and are immersed in the sand of said troughs substantially throughout their length, and suitable closures for the ends of said chamber.

4. An annealing furnace comprising an annealing chamber the floor of which is provided with a longitudinal channel, and which has a charging opening at one end and a discharging opening at the other, a series of end to end contacting cars, an endless run therefor extending throughout its length in the same vertical plane which run passes through and out of said chamber in said channel, said cars having their side edges engaging the structure of the side-walls of said channel, said cars having their floors provided with raised structures for supporting the work, and doors for closing the end openings of said annealing chamber, the lower edges of which are recessed to permit the passage of said raised structures.

5. An annealing furnace comprising an annealing chamber having openings at both ends, a series of cars, an endless run therefor extending throughout its length in the same vertical plane which run passes through and out of said chamber, said cars having their floors provided with longitudinally disposed raised structures for supporting the work, and raising doors for closing the end openings of said chamber, the lower edges of which are recessed to permit the passage of said raised structures.

6. An annealing furnace comprising an annealing chamber the floor of which is provided with a longitudinal channel and provided with openings at its ends, a series of end to end contacting cars, an endless run therefor extending throughout its length in the same vertical plane which run passes through and out of said chamber in said channel, said cars having their floors provided with parallel longitudinally disposed walls for supporting the work, and doors for closing the end openings of said annealing chamber whose lower edges are recessed to permit the passage of said walls.

7. An annealing furnace comprising an annealing chamber the floor of which is provided with a longitudinal channel and has openings at its ends, a series of end to end contacting cars, an endless run therefor extending throughout its length in the same vertical plane which run passes through and out of said chamber in said channel, said cars having their floors covered with refractory material and their side edges provided with depending sealing plates, longitudinal sand-troughs secured to the side-walls of said channel in which the lower edges of said sealing-plates are immersed, and doors closing the end openings of said chamber above the floor of said trucks.

8. An annealing furnace comprising an annealing chamber provided with a charging opening at one end and a discharging opening at the other, the ceiling of which slopes downward from the discharging end toward the charging end, and the floor of which is provided with a longitudinal channel, a series of end to end contacting cars, an endless run traveled by said cars, which latter, in transit, travel through said chamber in said channel and have their side edges adapted to seal the channels below their floors, and raising doors adapted to close the end openings of the chamber above the floor of said cars.

9. In an annealing furnace having an annealing chamber open at both ends, a tunnel extending in the same longitudinal direction under the same and terminating at points beyond the ends thereof, elevators connecting the ends of said tunnel with the surface, a car adapted to be transferred from the surface to said tunnel and vice versa, and to traverse said chamber and tunnel in opposite directions, and closures for the ends of said chamber.

10. In an annealing furnace having an annealing chamber open at both ends, a tunnel extending in the same longitudinal direction under the same and terminating at points beyond the ends thereof, elevators connecting the ends of said tunnel with the surface, a series of end to end contacting cars adapted to be transferred from the surface to said tunnel and vice versa, and to traverse said chamber and tunnel in opposite directions and closures for the ends of said chambers.

11. In an annealing furnace having an annealing chamber open at both ends, a tunnel extending in the same longitudinel direction under the same and terminating at points beyond the ends thereof, and inclined downwardly from the end thereof adjacent to the discharge end of the chamber toward its opposite end, elevators connecting the ends of said tunnel with the surface, a series of cars that are adapted to be transferred from the surface to the tunnel and vice versa, and to traverse said chamber and tunnel in opposite directions, and closures for the ends of said chambers.

12. In an annealing furnace having an annealing chamber provided with a charging opening at one end thereof and a discharge opening at its opposite end, and suitable closures for said openings, a tunnel extending longitudinally under said annealing chamber whose ends terminate beyond the ends thereof, elevators connecting the ends of said tunnel with the surface, stripping-rails alining with the openings of said chamber the adjacent ends of which overhang the shafts in which said elevators operate, in combination with a car adapted to move through said chamber to and onto said elevator and dispose of its load upon said stripping-rails as it is lowered to said tunnel, through which latter it moves back to the elevator at its opposite end and is raised thereby to its starting points.

Signed at Bettendorf, Scott county, Iowa, March 11th 1911.

JOSEPH W. BETTENDORF,
*Administrator of the estate of William P. Bettendorf, deceased.*

Witnesses:
A. B. FRENIER,
F. M. GODDARD.